Oct. 3, 1972          R. S. MORRISON                3,695,968
        METHOD OF MAKING A FIBROUS GLASS PLASTIC ENCAPSULATED
                      PLYWOOD OR LIKE CORE PANEL
Filed Nov. 10, 1970                              7 Sheets-Sheet 1

INVENTOR
ROBERT S. MORRISON

Oct. 3, 1972   R. S. MORRISON   3,695,968
METHOD OF MAKING A FIBROUS GLASS PLASTIC ENCAPSULATED
PLYWOOD OR LIKE CORE PANEL
Filed Nov. 10, 1970                          7 Sheets-Sheet 3

INVENTOR
ROBERT S. MORRISON

Oct. 3, 1972 R. S. MORRISON 3,695,968
METHOD OF MAKING A FIBROUS GLASS PLASTIC ENCAPSULATED
PLYWOOD OR LIKE CORE PANEL
Filed Nov. 10, 1970 7 Sheets-Sheet 7

INVENTOR
ROBERT S. MORRISON

United States Patent Office 3,695,968
Patented Oct. 3, 1972

3,695,968
METHOD OF MAKING A FIBROUS GLASS PLASTIC ENCAPSULATED PLYWOOD OR LIKE CORE PANEL
Robert S. Morrison, Ashtabula, Ohio, assignor to Morrison Industries, Inc., Ashtabula, Ohio
Continuation-in-part of abandoned application Ser. No. 727,808, May 9, 1968. This application Nov. 10, 1970, Ser. No. 88,409
Int. Cl. B32b 3/04
U.S. Cl. 156—216                         6 Claims

ABSTRACT OF THE DISCLOSURE

A reinforced plastic encapsulated plywood and like core panel cured and formed in matched metal dies, the preferred form of which includes fibrous glass roving wrapped about each of the edges of the plywood; method and apparatus for making the same which include winding the roving from side to side and end to end about the plywood core, applying the resin, and forming and curing the resin in a press having such dies, and then removing flash from the finished product.

---

This application is a continuation-in-part of my application Ser. No. 727,808, filed May 9, 1968, entitled "Fibrous Glass Plastic Encapsulated Plywood and Like Core Panel and Method of Making the Same," now abandoned.

This invention relates generally as indicated to a fibrous glass plastic encapsulated plywood and like core panel and method of making the same and more particularly to an economical panel structure having superior strength, abrasion and impact resistance.

It has been discovered that by completely encapsulating plywood in a tough, impact and abrasion-resistant shell of fibrous glass reinforced plastic, load bearing characteristics of the plywood are more than doubled while deflection characteristics are more than halved. Not only is the external surface of the resulting panel extremely resistant to abrasion, denting, scratching, and delamination, but the strength characteristics of the plywood core are greatly improved.

Efforts have been made in the past to provide plastic laminates on plywood but these have not completely encapsulated the plywood thus providing only a partial surface coating. With such partial surface coating, it is appreciated that the plywood or core is still subject to adverse effects due to humidity changes. Since plywood is known to warp and change dimensionally as humidity varies, it will be appreciated that a complete encapsulation of the plywood will avoid these drawbacks in plywood paneling or only partially coated plywood.

It is accordingly a principal object of the present invention to provide an economical panel structure having superior strength, abrasion and impact resistance.

It is another principal object to provide a plywood panel having complete surface characteristics of reinforced plastic.

Another important object is the provision of a plywood core panel having load bearing and deflection characteristics more than double that of the plywood core alone.

A further object is the provision of a method of making such panels wherein strands of fibrous glass can quickly and conveniently be wrapped about the plywood core and the resin applied in the desired fashion.

Still another object is the provision of a method of making such panels using matched metal dies providing excellent adhesion of the laminate to the core and exacting tolerances.

A still further object is the provision of a matched metal die molding technique for the production of such panels which permits molded in textures and colors.

Yet another object is the provision of methods and apparatus for making an economical plywood panel structure having superior resistance to weathering and corrosion, superior mechanical properties, and which can easily be cleaned and kept free of contamination.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

THE PANEL

Figure 1:
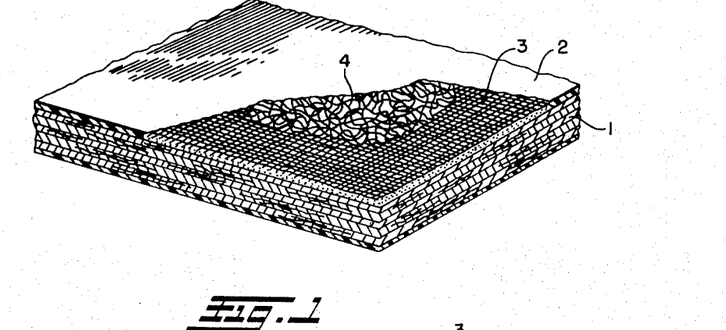
FIG. 1 is a fragmentary perspective view partially broken away and in section illustrating a preferred form of panel in accordance with the present invention.

Referring now to the annexed drawings and more particularly to FIG. 1, there is illustrated a plywood core 1 which may, for example, be marine grade plywood approximately ⅜ inch thick. The length and width of the plywood core may be any desired dimension such as, for example, 2 to 5 feet or more. In the preferred embodiment of FIG. 1, the plywood core 1 is encapsulated with a reinforced plastic shell 2 which includes superimposed biaxially directed continuous strand glass fiber roving shown generally at 3 with a veil or surfacing continuous strand mat 4 superimposed thereover. The preferred resin is polyester which provides tough impact resistance as well as resistance to weather and ultra-violet degradation. It will, however, be appreciated that any thermosetting resin may be employed such as diallyl phthalate, melamine, acrylic, silicones, phenolics, vinyl esters or epoxies.

Figure 2:
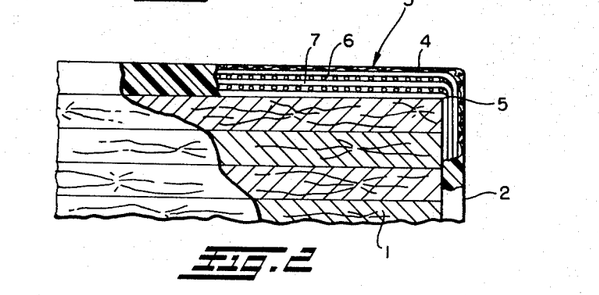
FIG. 2 is an enlarged fragmentary section illustrating such preferred form of the invention utilizing continuous roving wrapped about the edges of the plywood core.
Figure 3:
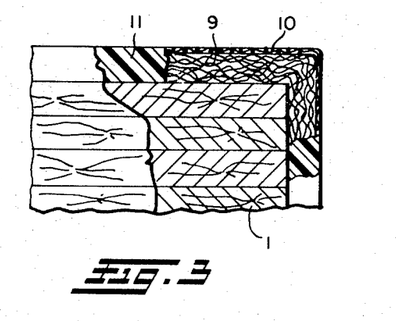
FIG. 3 is a similar enlarged fragmentary section showing another embodiment of the panel in accordance with the present invention.

As shown perhaps more clearly in FIG. 3, the continuous strand roving is wrapped about the edges of the plywood panel core indicated at 5 and may include superimposed layers seen at 6 and 7 extending substantially normal to each other. The veil or surfacing mat 4 is positioned thereover and the resin is cured and shaped in matched metal dies as hereinafter more clearly described. As seen the roving extending normal to the viewer in FIG. 2 is wrapped about the plywood core as close as possible to the edge 5.

In FIG. 3, there is illustrated another embodiment of the panel utilizing instead of the wrapped roving a continuous strand mat 9 which is wrapped about the edges 5 of the plywood core as shown. A surfacing mat or veil 10 is superimposed over the continuous strand mat 9 and the resin 11 is, of course, heat cured and shaped in the matched metal dies. Continuous strand reinforcing mats are available in large rolls and they may vary in weight from approximatey ¾ to 3 ounces per square foot. The surfacing veil or mat is, of course, much lighter and utilized mono-filaments. Such surfacing mat is employed to cover irregularities by drawing a slight excess of resin to the surface next to the mold. This improves the appearance and weathering of the finished panel.

Figure 4:
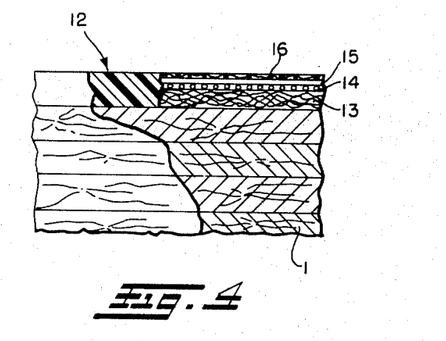
FIG. 4 is a fragmentary enlarged section illustrating yet another embodiment of a panel in accordance with the invention.

FIG. 4 illustrates a panel structure which is a combination of the embodiments of FIGS. 2 and 3 utilizing a shell or encapsulating cover 12 for the plywood core 1 which comprises a somewhat thinner reinforcing continuous strand mat 13 with continuous roving extending in two layers both normal to the plane of FIG. 4 as well as in the plane of FIG. 4. These layers are seen at 14 and 15. Finally, a surfacing mat or veil 16 is superimposed over the wound roving and this multi-layered fibrous glass structure comprises the reinforcement for the polyester resin which encapsulates the core 1. It will be understood that the thicknesses of the mats or number of layers of roving may be varied substantially.

Continuous roving may comprise approximately 60 strands with each strand being composed of 204 glass mono-filaments and these may be preformed into a blanket of unidirectional single layers rovings stitched together to be wrapped simultaneously about the plywood core. The resin may be applied with the wrapping of the roving or may be applied after the reinforcement is secured to the core. Additionally, a prepreg may be used which may comprise roving chopped to about 2 inch lengths and impregnated with the resin. The resin would be a suitable sheet molding compound.

Woven roving may also be employed which may comprise an uneven ratio of longitudinal to lateral strands with the lateral strands being more widely spaced. For example, a ratio of from about 13 to about 16 longitudinal strands may be employed for every 10 lateral strands.

FIGS. 5 THROUGH 10

Figures 5, 7, 8, 9, 10:
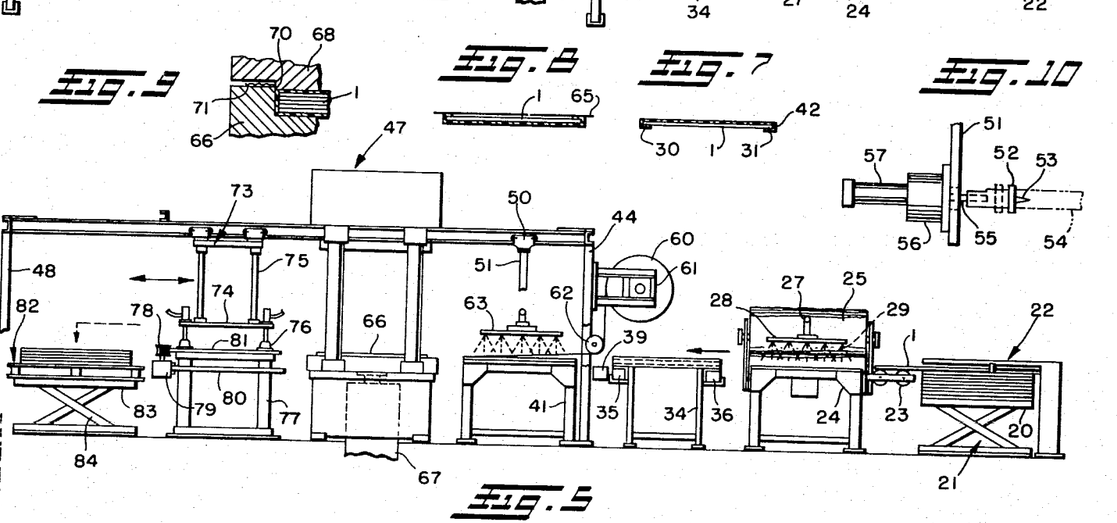
FIG. 5 is an elevation of apparatus for manufacturing a panel structure of the type seen in greater detail in FIG. 3.
FIG. 7 is a transverse section on a reduced scale of a continuous strand mat and resin applied to a plywood core at one point in the apparatus seen in FIGS. 5 and 6.
FIG. 8 is a view similar to FIG. 7 illustrating the panel turned over with a continuous strand mat being applied to the opposite side.
FIG. 9 is a slightly enlarged fragmentary vertical section of the panel in the matched heated metal dies of the molding press.
FIG. 10 is a detail view of the panel holding chuck of the apparatus of FIGS. 5 and 6 which is effective to rotate or flip over the panel from the FIG. 7 to the FIG. 8 position.
Figure 6:
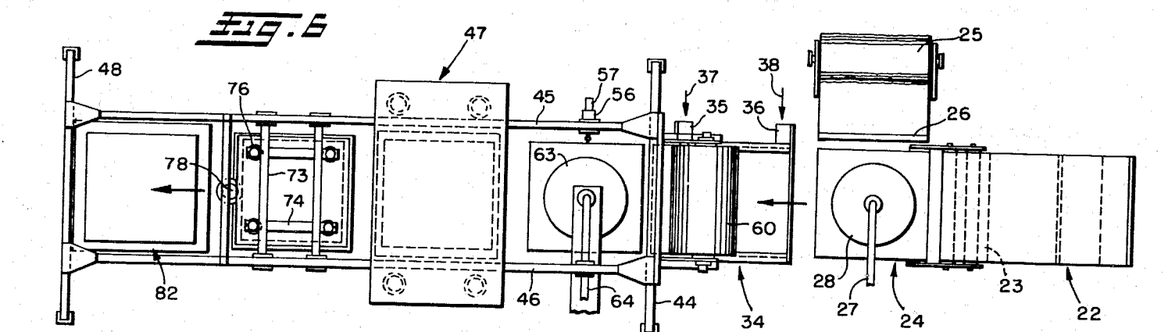
FIG. 6 is a top plan view of the apparatus seen in FIG. 5.

Referring now more particularly to FIGS. 5 through 10, there is illustrated apparatus for making the embodiment of the plywood panel shown more particularly in FIG. 3. As seen in FIGS. 5 and 6, the plywood cores 1 are stacked in a magazine on a supporting pallet or table 20, which through the structure shown at 21 automatically elevates as the weight on the table decreases. An indexing device 22 shuttles the individual plywood cores 1 over supporting conveyor idler rolls 23 onto stand 24. At this point, a mat and veil may be fed from roll 25 over the top surface of the plywood core 1 and an automatic feed and cut-off shown schematically at 26 may be employed to sever appropriate lengths from the stock roll 25. The veil and mat may be wound in contiguous layers on the roll 25 to be applied and severed simultaneously or, it will be appreciated, that separate rolls for the veil and mat may be used. When the veil and mat are properly positioned over the plywood core, resin is applied from supply line 27 through dispenser 28 as seen more clearly at 29 in FIG. 5.

The veil and mat will be substantially wider and longer than the lateral and longitudinal dimensions of the plywood core so that the edges may be wrapped around the edges of the core 1 as seen in FIG. 2 and stapled to the underside thereof as shown at 30 and 31 in FIG. 7. This stapling or stitching operation is accomplished at the next station on stand 34. The transverse under edges of the panel may be stapled by two traveling stitchers seen at 35 and 36 which move in the direction of the arrows 37 and 38. The lateral edges of the panel may be stapled by two stationary stitchers shown at 39 which are effective to staple the folded over edges of the mat and veil as the panel moves from the stand 34 to the next stand 41.

When the plywood core arrives at the stand or station 41, it will appear as in FIG. 7 with the folded over edges of the veil and mat shown at 42 being stapled to the underside of the core 1. A predetermined amount of resin has already been applied to the top surface of the panel.

At this point, the panel has passed through a vertical frame 44 which supports at its top two rails 45 and 46. These rails extend through press 47 and are supported at the opposite end by vertically extending frame 48. A traveling crane or carriage 50 is mounted on the rails and includes a pair of pendant interconnected arms 51, on the lower ends of which are the retractable rotary chucks seen in greater detail in FIG. 10.

Such chucks include elongated bars 52 from which project inwardly directed laterally spaced pins 53 which are adapted to puncture and grasp the lateral edges of the plywood core with the mat and veil wrapped thereabout as seen at 54. The bar 52 is mounted on a retractable shaft 55 driven for oscillation by air motor 56 mounted on the exterior of the arm 51. Extension and retraction of the shaft is obtained by the pneumatic piston-cylinder assembly 57.

When the panel is in position on the stand 41, the piston-cylinder assemblies 57 of the chucks on the arms 51 are extended to grasp the edges of the panel and with the panel securely positioned therebetween the motors 56 are energized to rotate the panel 180° turning it upside down. At this time and with the chucks still grasping the lateral edges of the panel, a veil and mat from supply roll 60 mounted on the cantilevered arms 61 projecting from frame 44 may be automatically fed over the exposed surface of the panel and severed to the appropriate length. The mat and veil may extend around the idler roll 62 shown. At this time, a resin applicator 63 extends into position above the panel and resin is applied from supply line 64 through the dispenser to the veil and mat on the now top surface of the panel. The supply lines 64 and 27 for the resin applicators may be connected to a common resin drum and pump for both stations.

Referring momentarily to FIG. 8, it will be seen that the plywood panel has been turned upside down and the mat and veil from the roll 62 has been applied to the exposed surface of the core with the edges slightly projecting as seen at 65. It will be appreciated that the resin will now be applied and the crane 50 shifted to position the now prepared panel for final molding in the press 47.

After the application of the resin and with the press 47 open, the crane 50 now traverses to the left into the opening of the press and retraction of the piston-cylinder assemblies 57 will deposit the now prepared plywood panel in the bottom die 66 of the press. The crane 50 now returns to its original position seen in FIG. 5 to receive the next plywood panel.

The press now closes with the bottom die 66 being elevated by the relatively large piston-cylinder assembly 67 to mate with the top die 68 as seen in better detail in FIG. 9.

As the dies come together, it will be appreciated that the upper or male die 68 telescopes within the lower or female die 66 to place the plywood core and the resin and fibrous glass thereabout under heat and pressure. It will be understood by those skilled in the art that the pressure created by the press on the work will be substantial and in any event in excess of atmospheric pressure. Where the dies meet peripherally as indicated at 70, a slight flash will be created seen at 71. The required cure time for the panel may vary depending, of course, on the size of the panel and the thickness of the encapsulation as well as the type of resin employed. Utilizing the preferred polyester, a cure time of 1.5 to 5 minutes is sufficient. The dies may be heated to about 250° F.

Following the cure cycle, the press is opened and the traveling crane indicated at 73, also mounted on rails 45 and 46, now moves into the press to remove the cured panel therefrom. The crane 73 comprises a pair of plates 74 pendantly supported on posts 75 and retractable vacuum cups 76 are mounted at the end of each plate 74. In this manner, the cured panel is lifted from the bottom or female die 66 and placed on stand 77 and held in a precise position with respect thereto. A deburring tool 78 driven for rotation by drive motor 79 is mounted on track 80 running peripherally of the stand and while the panel 81 is held by the vacuum cups 76, the deburring tool will traverse the track 80 finishing the edge and removing any flash which may result in the molding process. At the conclusion of the deburring process, the crane simply lifts the finished panel onto pallet stacker 82, the table 83 of which descends through the mechanism 84 as the weight of the stack increases.

It can now be seen that with the apparatus shown in FIGS. 5 through 10, fibrous glass reinforced plastic encapsulated plywood panels such as shown in FIG. 3 can economically be produced.

Figure 11:
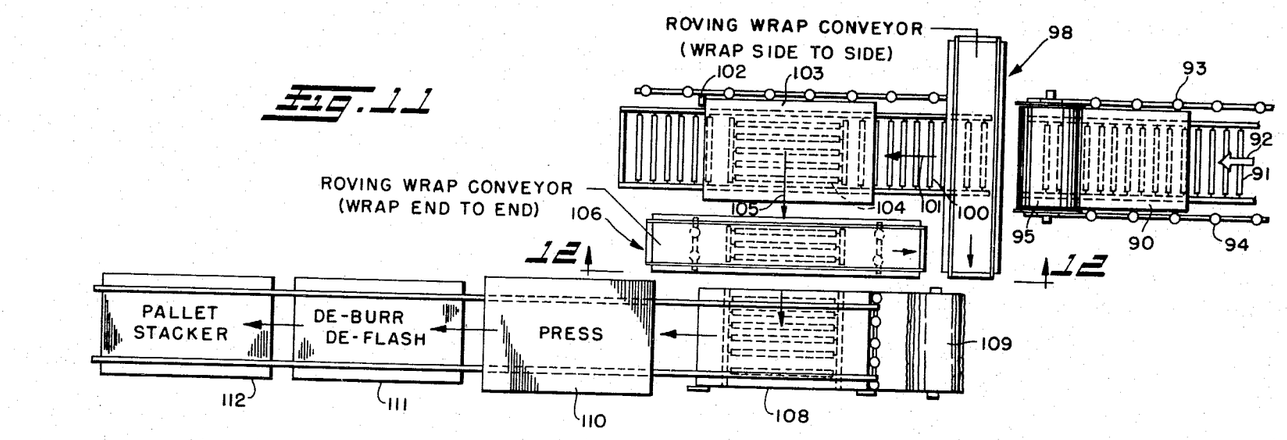
FIG. 11 is a top plan view of another form of apparatus for wrapping the plywood core with continuous glass fiber roving both end to end and side to side to form the preferred panel.
Figure 12:
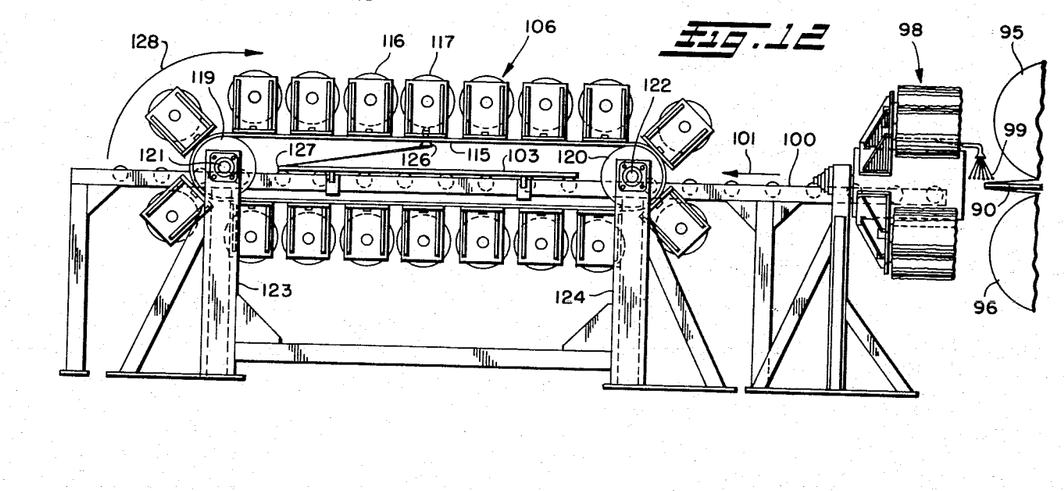
FIG. 12 is an enlarged section taken substantially on the line 12—12 of FIG. 11.

FIGS. 11 and 12

In FIGS. 11 and 12, there is shown apparatus which may be employed to produce either the FIG. 2 form of panel or the FIG. 4 form of panel depending on whether or not there is applied before the wound roving the interior layer of mat 13. As seen in FIG. 11, the plywood core 90 is transported on a roll-type conveyor 91 in the direction of the arrow 92 from a suitable plywood magazine, not shown. The panel is maintained in proper position on the conveyor 91 by side guide rollers as indicated at 93 and 94. The rolls of the conveyor 91 may be power driven or a suitable indexing mechanism, not shown, may be employed. The plywood panel 90 passes between two large rolls 95 and 96 seen more clearly in FIG. 12, such being supply rolls of continuous strand mat which may be applied to both the top and bottom surfaces of the plywood core. As the plywood core continues to advance, it passes through a winding machine shown generally at 98 which wraps around the panel and the mat thereon continuous strand roving indicated at 99. This roving may be the same as the layer of roving 14 seen in FIG. 4.

From the winding machine 98, the plywood panel having the roving wrapped from side to side moves out onto conveyor 100 in the direction of the arrow 101 against stop 102. The panel shown at 103 is now lifted from the conveyor 100 by conveyor section 104 and moved in the direction of arrow 105 through winding machine 106 which wraps the roving end to end about the panel. The winding machines 98 and 106 may be substantially identical in form and are shown in better detail in FIG. 12.

The winding machine 106 may wrap a second layer of roving about the panel with the strands extending normal to the layer of roving wrapped by the machine 98 and such strands may be seen, for example, at 15 in FIG. 4. From the winding machine 106, the panel moves now onto conveyor table 108 and veils or surfacing mats from supply rolls 109 may be supplied to the top and bottom surfaces if desired. The prepared panel then moves through the press 110, the deburr and deflash station 111, and to the pallet stacker 112. The press loading and unloading mechanism may be the same as seen in FIG. 5.

The resin is applied to the fibrous reinforcement by the winding machines 98 and 106 simply by having the various strands of roving pass through a resin bath. The resin applicator may be located in the winding nozzles seen more clearly in FIG. 12. Referring now to FIG. 12, it will be seen that each winding machine comprises a heavy duty conveyor 115 on which are mounted a plurality of stands 116 each having journalled therein a spool of roving 117. The conveyor 115, which may actually be two side by side chains, is journalled about sprockets 119 and 120 mounted on shafts 121 and 122, respectively, journalled at the top of posts 123 and 124. These posts are mounted laterally of the respective panel conveyor paths and such chains enclose the panels for passage therethrough.

The strands of roving from each spool are guided to a nozzle 126 slightly offset from the winding machine as perhaps seen more clearly in the end elevation of the winding machine 98 in FIG. 12. This nozzle may include a suitable resin applicator and as seen the end of the strands may be stitched to the edge of the panel as indicated at 127 so that as the winding machine moves in the direction of the arrow 128, the roving will be wrapped about the panel from end to end by the machine 106 and from side to side by the machine 98. As the panel progresses through the winding machine, the convolutions of roving wrapped about the panel will extend in the direction of movement. It will be appreciated that more than one layer of roving may be applied in this manner depending upon the speed of the panel moving through the winding machine.

At the completion of the winding operation, the operator need only sever the parallel single layer of roving strands and stitch them to the panel. The leading edge of the strands will then be stitched to the next panel coming through the winding machine.

It can be now seen that in FIGS. 11 and 12, there is illustrated apparatus and a method for economically manufacturing biaxially wound fibrous glass reinforced plastic encapsulated panels as seen, for example, in FIGS. 1, 2 or 4.

FIGS. 13 THROUGH 16

In FIGS. 13 through 16, there is illustrated apparatus for winding biaxially plywood panels with a blanket of glass fiber roving, such blanket being roving loosely stitched together in a common plane with each roving strand being parallel to the others. This apparatus may be used to form the preferred panel embodiment of FIGS. 1 and 2 or the panel embodiment of FIG. 4.

Figure 13:
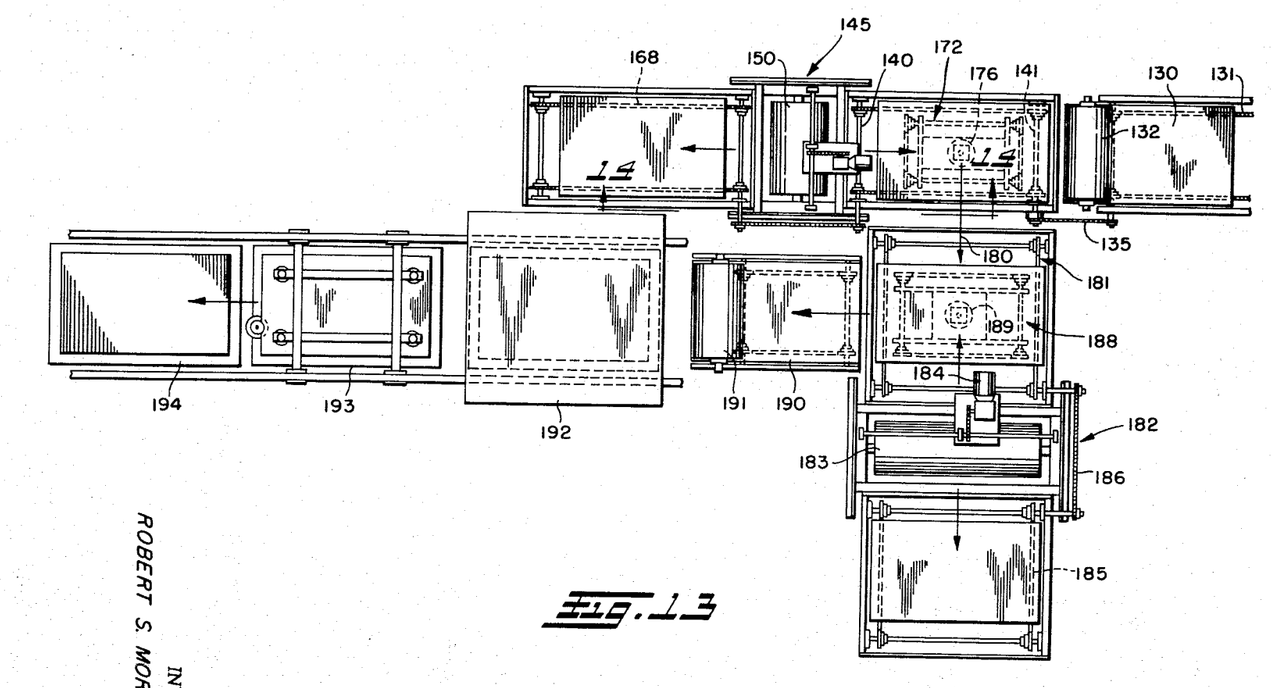
FIG. 13 is a top plan view of a preferred apparatus for manufacturing a panel such as seen in FIGS. 1 and 2 biaxially wrapping the plywood core with a blanket of continuous parallel roving both side to side and end to end.
Figure 15:
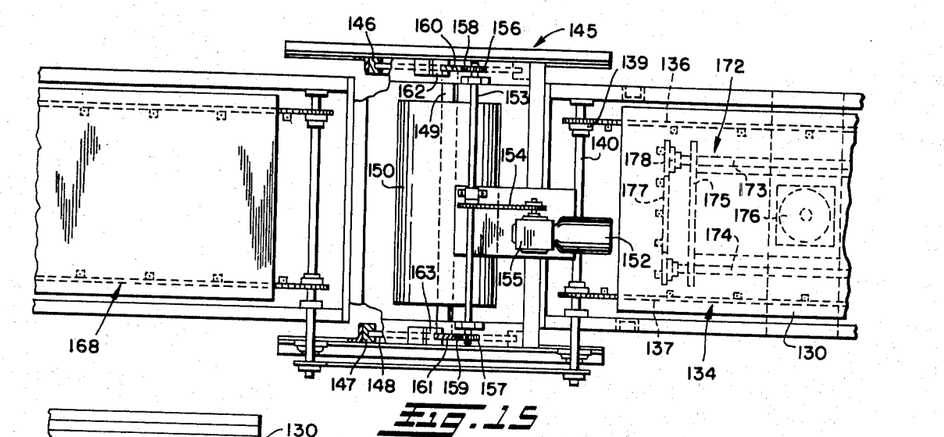
FIG. 15 is a top plan view of such wrapping mechanism taken substantially from the line 15—15 of FIG. 14.

Referring first to FIGS. 13 and 15, it will be seen that the plywood panel 130 may be conveyed from a suitable plywood magazine on a conveyor 131 to pass between rolls 132 of relatively thin continuous strand mat. This mat may be stitched to both surfaces of the panel. Alternatively, the application of the thin mat by means of the rolls 132 may be omitted.

From the conveyor 131 the panel 130 passes onto conveyor 134 which is drivingly interconnected to the conveyor 131 as shown at 135. An overrunning clutch may be employed in this drive 135 so that when the conveyor 134 is driven reversely, the conveyor 131 will be unaffected. Both conveyors may be of similar construction, the detail of which is shown more clearly in FIG. 16. The conveyor 134, for example, comprises laterally spaced chains 136 and 137, each trained about sprockets 139 on shafts 140 and 141. Certain regularly spaced links of the chain are in the form of angle brackets 142 provided with outwardly projecting pins 143 which engage the underside of the panel 130.

Figures 14, 16:
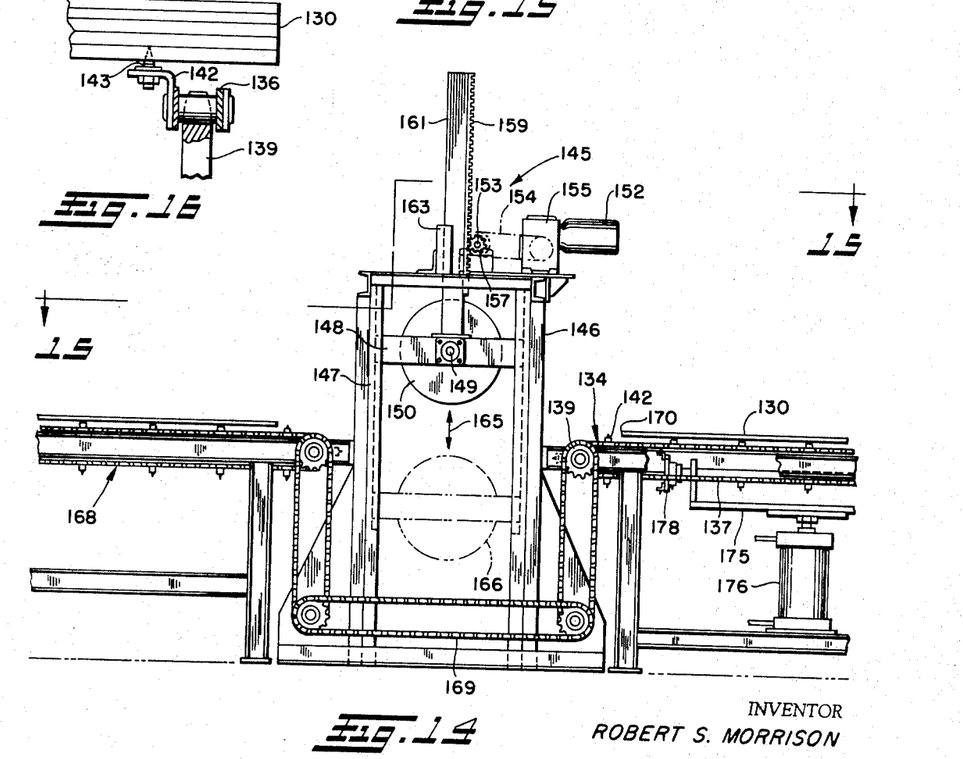
FIG. 14 is an enlarged vertical section of the wrapping mechanism taken substantially on the line 14—14 of FIG. 13.
FIG. 16 is an enlarged detail of the panel conveying structure.

From the conveyor 134, the panel passes into a winding machine 145 which includes an upstanding frame 146, the four columns of which include inwardly directed gibs or guides 147 in which the side frames 148 supporting opposite ends of blanket roll shaft 149 are mounted for vertical reciprocation. A blanket roll 150 is mounted on such shaft for rotation. A drag brake for this shaft may provide controlled resistance to rotation.

Vertical reciprocation of the roll is obtained by drive motor 152 mounted on the top of the winding machine rotating shaft 153 through chain drive 154 and speed reducer 155. The shaft 153 is provided with pinions 156 and 157 at opposite ends in mesh with racks 158 and 159, respectively. These racks are in turn mounted on vertically extending guide bars 160 and 161 mounted in guides 162 and 163 on the top of the frame 146 opposite the pinions 156 and 157, respectively. The guide bars are connected to the frames 148 supporting the opposite ends of the roll shaft 149. In this manner, the blanket roll 150 may be moved up and down as indicated by the arrow 165 seen in FIG. 14 with the phantom line position 166 being the lowermost position obtainable.

On the opposite side of the winding machine 145 there is provided a conveyor 168 which may be identical to the conveyor 134 and such conveyors are drivingly interconnected by the drive indicated at 169 which extends beneath the path of movement of the roll 150 of the winding machine 145.

In operation of the winding machine, the blanket roll 150 will be in its elevated position and the panel 130 will move from the right to the left beneath the roll as seen, for example, in FIG. 14. The leading edge of the blanket on the roll 150 may be stitched to the edge of the panel as indicated at 170 and as the panel moves from right to left, it will draw the blanket from the roll 150. The panel will move onto conveyor 168 and as soon as the opposite edge of the panel has cleared the roll 150, the roll will be caused to descend through the drive motor 152. The conveyor system is now reversed and the panel moves back to the right, this time above the roll 150. The movement of the panel draws the blanket from the roll wrapping it completely around the four longitudinal corners of the plywood. This operation may be repeated as many times as desired to build up additional layers of the blanket about the panel. A resin applicator may also be employed in the winding machine simply by passing the blanket through a resin bath.

When the winding operation is complete, the operator simply severs the blanket and stitches the edge in place. This may be done automatically if desired. The blanket covered panel now moves back onto the conveyor 134 to a position beneath a relatively short conveyor 172 positioned between the chains 136 and 137. This conveyor extends normal to the conveyor 134 and comprises shafts 173 and 174 mounted on frame 175 which is in turn supported by elevator piston-cylinder assembly 176 seen more clearly in FIG. 14. The conveyor 172, like the conveyors 134 and 168, comprises chains 177 trained about sprockets 178 on the shafts 173 and 174 with pins projecting from certain spaced chain links.

When the conveyor section 172 is elevated, it will lift the panel 130 over the chain 137 stripping the panel from the pins of the conveyor 134. When the conveyor 172 is driven, it will move the panel in the direction of the arrow 180 seen in FIG. 13 onto conveyor 181. This conveyor moves the panel into a further winding machine 182 which may be identical in form to the winding machine 145. This winding machine also contains a blanket roll as seen at 183 which moves beneath the panel by means of the drive motor 184 after the panel has moved out onto conveyor 185 which is drivingly interconnected to the conveyor 181 through the drive mechanism 186. It is noted that the blanket roll 183 is approximately the same width as the side to side dimension of the panel passing therebeneath while the roll 150 is the same transverse dimension as the same panel passing beneath that roll. After the blanket has been wrapped about the panel in a direction normal to the blanket previously applied, the panel is then repositioned on the conveyor 181 and a relatively short section conveyor 188 between the chains of the conveyor 181 is elevated by piston-cylinder assembly 189 to transfer the now biaxially wrapped panel onto conveyor 190.

At this station, a surfacing mat or veil may be applied to the panel from the rolls 191 and additional resin may also be applied. The now prepared panel is then transferred into the press 192 for shaping and curing. From the press, the panel is then unloaded to the deburr and deflashing station 193 and finally onto a pallet stacker 194. The press loading, unloading, deburring, deflashing and pallet stacking may be substantially as shown in FIG. 5.

In this preferred form of apparatus for practicing the method of the present invention, it can be seen that the panel can be biaxially wrapped with a blanket of roving in a very short time simply by shuttling the blanket roll to opposite sides of the panel. If a greater reinforcement is required, the panel can, of course, be shuttled back and forth alternately on opposite sides of the blanket roll to obtain as many layers of blanket about the plywood core as desired.

Figure 17:
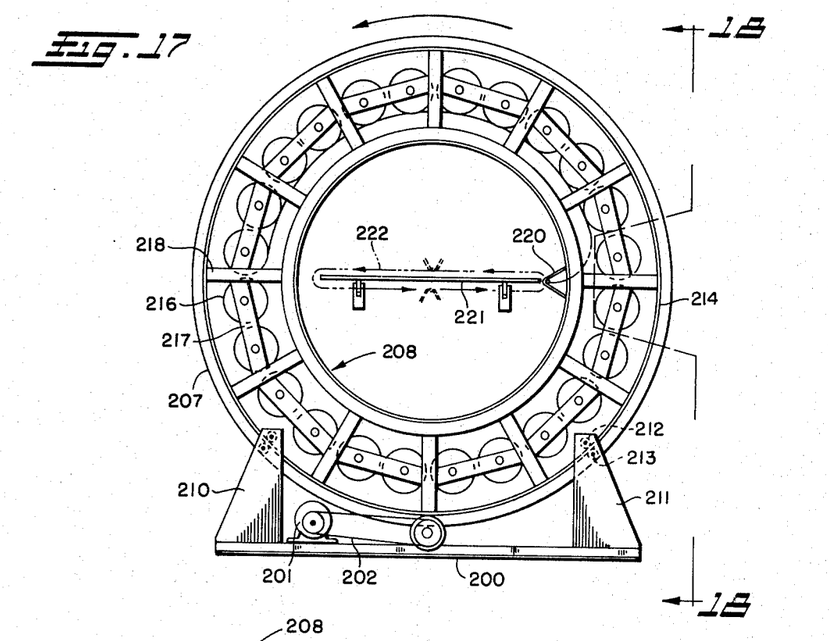
FIG. 17 is an elevation of yet another form of a continuous roving wrapping machine which may be utilized with the present invention.
Figure 18:
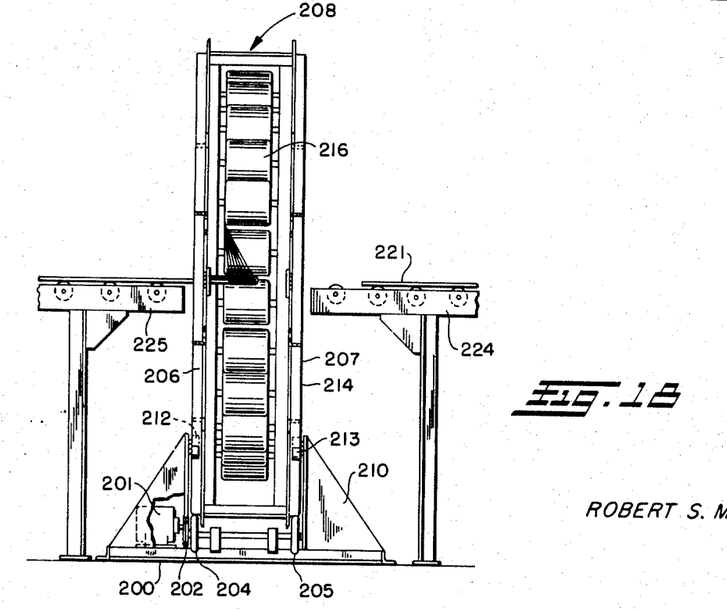
FIG. 18 is a fragmentary vertical sectional section of the wrapping mechanism of FIG. 17 taken substantially on the line 18—18 thereof.

FIGS. 17 and 18

Referring now to FIGS. 17 and 18, there is illustrated an alternative form of winding machine which may be utilized, for example, in lieu of the winding machines shown in the FIG. 12 embodiment. The winding machine comprises a base 200 on which is mounted drive motor 201 rotating through drive 202, wheels 204 and 205 which support and rotate large diameter flanged wheels 206 and 207, respectively, mounted on circular rotary frame 208. The base includes upstanding lateral supports 210 and 211 on each side of the wheel frame 208, each including relatively small guide rolls 212 and 213 running on opposite sides of the flange 214 of the large wheels or rims 206 and 207.

Journalled about the wheel 208 are a plurality of spools of roving 216, such spools being mounted on circularly extending frame sections 217 extending between spoke frame sections 218.

The interior of the frame is provided with a multiple orifice nozzle as seen at 220 through which the roving strands may be threaded and which may also contain the resin to apply the proper coating to each roving strand. The nozzle may be mounted to extend and retract as the wheel rotates to follow a path closely adjacent the surface of the panel 221 as indicated at 222.

The panel, of course, may be moved through the winding wheel from conveyor 224 to conveyor 225 at a controlled speed. In operation, the operator will tack or stitch the parallel strands of roving coming from the nozzle 220 to the leading lateral edge of the panel and as the wheel rotates and the panel progresses through the wheel, it will be wrapped with a layer of roving extending about each of the lateral edges of the panel. A second winding machine may be employed to wrap the roving in a normal direction to that of the machine illustrated wrapping the roving about each of the longitudinal edges of the panel.

Figure 19:
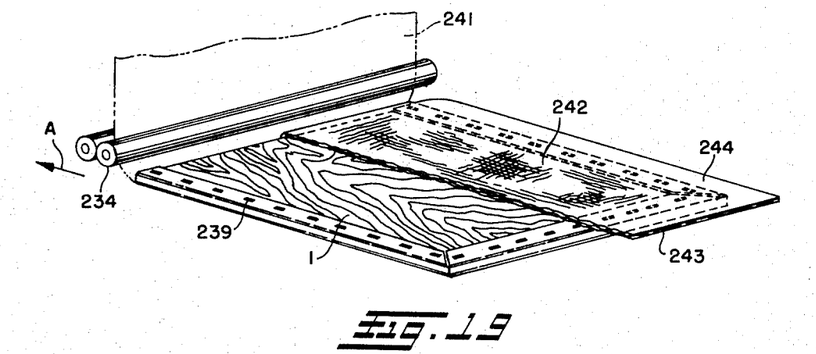
FIG. 19 is a schematic illustration of a plywood panel wrapped in resin impregnated roving or mat prior to placement in the press.
Figure 20:
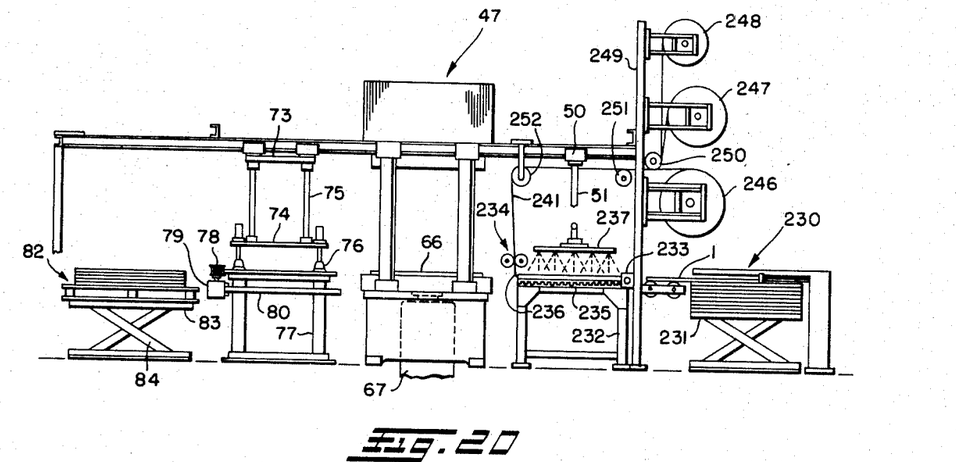
FIG. 20 is a side elevation of preferred apparatus for forming encapsulated plywood as illustrated in FIG. 19.

FIGS. 19 and 20

In FIGS. 19 and 20, there is illustrated a preferred apparatus for encapsulating a plywood panel with fibrous glass reinforced plastic with FIG. 19 illustrating the panel wrapped with the fibrous glass and impregnated plastic just prior to entering the forming press. The apparatus is similar to but somewhat more simplified than the apparatus seen in FIG. 5 in that only a single wrapping of the applied fibrous glass material is wrapped about the plywood core 1.

Referring first to FIG. 20, there is illustrated a magazine 230 supporting a stack of plywood cores on table 231 which may elevate as the stack is reduced. The plywood cores 1 are fed one at a time onto a stand 232 over a layer of fibrous glass material which has been pulled by a suitable gripper mechanism 233 from the nip of a pair of pinch rolls 234. The gripper mechanism may be shuttled back and forth across the top of the stand 232 by the rack and pinion drive seen schematically at 235.

Before the plywood core 1 is positioned on the stand, the gripper mechanism will have traversed to the right as seen in FIG. 20 gripping the free end of the fiber glass material 236 pulling the same from the pinch rolls across the top of the stand. Also before the indexing of the plywood core over the stand suitable resin from applicator 237 will be applied to the fibrous glass material.

After the application of the resin, the plywood core is then indexed over the resin impregnated fibrous glass and the lateral and end edges are tacked up over the top of the plywood core by suitable stitchers as seen at 239 in FIG. 19. After the fibrous glass beneath the plywood core 1 is tacked up over the rear lateral edge and the two longitudinal edges as seen in FIG. 19, resin from applicator 237 is again applied directly to the top of the plywood core.

The partially prepared plywood core is now engaged by chucks such as those shown in FIG. 10 supported from the arms 51 of carriage 50 and move horizontally to the left in the direction of arrow A seen in FIG. 19 into the press 47 beneath the pair of pinch rolls 234. This causes the layer of fibrous glass extending down between such pinch rolls as indicated at 241 in FIGS. 19 and 20 to lay over the top of the core as seen at 242. The continuous layer of fibrous glass material is then severed at 243 adjacent the pinch rolls 234 overlapping both lateral edges and the trailing longitudinal edge of the plywood core therebeneath as seen at 244. The transverse severing of the fibrous glass material 241 beneath and adjacent the pinch rolls 234 leaves a free end again to be picked up by the gripping mechanism 233 to be layed over the stand 232 to receive resin and again another plywood core.

The now prepared plywood, fibrous glass and resin structure is positioned in the bottom die as in the FIG. 5 embodiment to be shaped and cured when the press closes. The removal mechanism and that which finishes the peripheral edge and stacks the finished panel on table 83 may be the same as in the FIG. 5 embodiment.

The fibrous glass may be supplied from rolls 246, 247 or 248 supported in cantilevered fashion from vertical frame 249. The fibrous glass passes beneath idler roll 250 and above idler rolls 251 and 252 before passing downwardly through the nip of pinch rolls 234. For example, the material of roll 246 may be a continuous strand mat, the material of roll 247 may be woven roving as described above, and the material of roll 248 may be a surfacing veil. Other fibrous glass materials may, of course, be used and it will be appreciated that the material of the top roll will form the outer layer while that of the lower will form the inner layer. The middle roll 247 will form the middle layer.

It can now be seen that there is provided an economical panel structure having the surface characteristics of reinforced plastic, such structure utilizing a plywood core which is completely encapsulated by the fibrous glass reinforced plastic. The various methods and apparatus disclosed can produce economically the completely encapsulated plywood which makes an excellent paneling material for freight containers, interior walls, concrete forms and practically any use heretofore made of plywood.

It will be appreciated that the plywood panel or core may be provided with predrilled holes or inserts which during the encapsulating process will fill with resin. The inserts or holes can then be drilled out so that fastening devices can be used with the panel without puncturing the plastic encapsulation. Moreover, a gel coat can be added, if desired, to make the encapsulating surface of a hard glossy finish.

With the present invention, there is thus provided a much improved plywood panel which is molded in matched metal dies under heat and pressure. The panel obtains excellent resistance to weathering and chemicals and accelerated weathering tests have shown no adverse effects in hot, humid environments. The panel of the present invention provides a positive seal against moisture and eliminates the warping, swelling, and dimensional changes which are common in plywood.

Tests have shown that the load bearing and deflection characteristics of the panel of the present invention are more than double that of the plywood alone and the external surface, of course, is extremely resistant to abrasion, denting, scratching, and delamination. The matched die molding under heat and pressure provides excellent adhesion of the encapsulating laminate as well as providing exacting tolerances. The panel can very easily be cleaned and kept free of contamination. It may, for example, be steam cleaned without adverse effects, something which normal plywood cannot long tolerate. With the matched metal die molding techniques, it is possible to mold in various textures and colors or provide a die molded gel coat which is the best protective surface available. The panel can, of course, be made in a broad range of sizes and shapes and both the fibrous glass and core thickness can be varied depending upon the specific requirements of the user. Various lengths, widths and shapes are, of course, available simply by utilizing different size molds. For example, a large mold may be divided into a plurality of small molds depending upon the size required.

Although plywood is a preferred core for high load bearing application, similar advantages can be obtained with other types of cores such as balsa wood, filled paper honeycomb, corrugated kraft paper with ends taped, urethane foams, or any other similar closed cell core material. Closed cell material is required to obtain proper cure in the press. The pressure of the press may vary depending on the core material but will always exceed atmospheric pressure. For the preferred plywood core a minimum pressure of 150 p.s.i. is required for proper lamination. For other cores, the pressure will be dependent on the basic strength of the selected core material.

I, therefore, particularly point out and distinctly claim as my invention:

1. The method of making a reinforced plastic encapsulated plywood and like core panel comprising the steps of placing a first fibrous glass strand mat over one longitudinal side of said core, such first mat being wider and longer than said one side; applying a resin to such first mat; folding the periphery of said first mat around the lateral ends and edges of said core; securing the edges of said first mat to the other longitudinal side of said core by tracking or switching; placing a second fibrous strand mat over said other side, said second mat overlapping the first mat edges; applying resin to said second mat; placing the assembled panel in a mold; heat curing and pressure forming said assembled panel in said mold by placing the assembled panel under a minimum pressure of 150 p.s.i. at approximately 250° F.

2. The method of claim 1 wherein a covering veil is simultaneously positioned on said core with said two mats to provide an external surface for covering irregularities and forcing a slight excess of resin to the surfaces of the panel.

3. The method of making a reinforced plastic encapsulated plywood and like core panel comprising the steps of: placing an end portion of a continuous length fibrous glass strand mat over a longitudinal side of said core, such end portion being longer and wider than said side; folding the periphery of such portion around one end and two lateral edges of said core; securing the folded periphery to the other longitudinal side of said core by tacking or stitching; positioning a contiguous portion of said continuous length mat around the other end and over said other longitudinal side to overlap the secured, folded periphery; severing said end and contiguous portions from said continuous mat; applying resin to said mat portions; placing the assembled panel in a mold; and heat curing and pressure forming said assembled panel in said mold by placing the assembled panel under a minimum pressure of 150 p.s.i. at approximately 250° F.

4. The method of claim 3 wherein the resin is applied to the continuous mat by impregnation before association with said core.

5. The method of claim 3 wherein a continuous length blanket of roving and a continuous length surfacing veil are simultaneously applied with the mat to the core, said mat being the inner layer and said roving being the middle layer.

6. The method of claim 3 wherein the mold comprises a male die telescopically received in a female die to form the mold cavity.

References Cited

UNITED STATES PATENTS

| 2,965,529 | 12/1960 | Bright | 156—213 X |
| 3,413,188 | 11/1968 | Allen | 156—289 X |
| 3,122,750 | 3/1964 | Jackson et al. | 156—91 UX |
| 2,904,258 | 9/1959 | Miller, Jr. | 156—93 X |
| 3,444,029 | 5/1969 | Renaud et al. | 156—380 |
| 3,393,918 | 7/1968 | Styka | 156—172 |

BENJAMIN R. PADGETT, Primary Examiner

E. E. LEHMANN, Assistant Examiner

156—172, 188, 228, 213, 267; 161—50

UNITED STATES PATENT OFFICE
CERTIFICATE OF CORRECTION

Patent No. 3,695,968          Dated October 3, 1972

Inventor(s) Robert S. Morrison

It is certified that error appears in the above-identified patent and that said Letters Patent are hereby corrected as shown below:

Column 10, line 75, "tracking and switching" should be -- tacking or stitching --.

Signed and sealed this 15th day of May 1973.

(SEAL)
Attest:

EDWARD M. FLETCHER, JR.
Attesting Officer

ROBERT GOTTSCHALK
Commissioner of Patents